(12) United States Patent
Ponomarev et al.

(10) Patent No.: US 11,846,598 B2
(45) Date of Patent: Dec. 19, 2023

(54) REFERENCE ELECTRODE

(71) Applicant: Analog Devices International Unlimited Company, Limerick (IE)

(72) Inventors: Youri Victorvitch Ponomarev, Rotselaar (BE); Alfonso Berduque, Crusheen (IE)

(73) Assignee: Analog Devices International Unlimited Company, Limerick (IE)

( * ) Notice: Subject to any disclaimer, the term of this patent is extended or adjusted under 35 U.S.C. 154(b) by 41 days.

(21) Appl. No.: 17/566,984

(22) Filed: Dec. 31, 2021

(65) Prior Publication Data

US 2023/0213468 A1 Jul. 6, 2023

(51) Int. Cl.
*G01N 27/30* (2006.01)

(52) U.S. Cl.
CPC .................................. *G01N 27/301* (2013.01)

(58) Field of Classification Search
CPC ............. G01N 27/403; G01N 27/4035; G01N 27/301; G01N 17/02
See application file for complete search history.

(56) References Cited

U.S. PATENT DOCUMENTS

| | | | |
|---|---|---|---|
| 1,865,004 A * | 6/1932 | Haring | G01N 27/32 429/90 |
| 4,360,415 A * | 11/1982 | Brezinski | G01N 27/4035 204/406 |
| 10,830,725 B2 | 11/2020 | Zafar et al. | |
| 2020/0064307 A1 | 2/2020 | Lee et al. | |
| 2020/0150073 A1 | 5/2020 | Zafar et al. | |

FOREIGN PATENT DOCUMENTS

| | | |
|---|---|---|
| WO | 2004051251 A1 | 6/2004 |
| WO | 2010104962 A1 | 9/2010 |

OTHER PUBLICATIONS

Walker et al., *Leakless, Bipolar Reference Electrodes: Fabrication, Performance, and Miniaturization*, Analytical Chemistry, © 2021 American Chemical Society, 10 pages.
Guerrette et al., *Coupled Electrochemical Reactions at Bipolar Microelectrodes and Nanoelectrodes*, Analytical Chemistry, © 2012 American Chemical Society, 8 pages.
Kwon et al., *An All-Solid-State Reference Electrode Based on the Layer-by-Layer Polymer Coating*, Analyst 2007, The Royal Society of Chemistry, 7 pages.
International Search Report and Written Opinion for International Patent Application No. PCT/EP2022/086582, dated Apr. 5, 2023 (14 pages).

* cited by examiner

*Primary Examiner* — Alexander S Noguerola
(74) *Attorney, Agent, or Firm* — ArentFox Schiff LLP

(57) ABSTRACT

A reference electrode with a liquid-impermeable enclosure comprises a chamber for a reference electrolyte. The reference electrode also comprises a first electrode element comprises a reference electrolyte electrode surface arranged to contact a reference electrolyte located within the chamber and a second electrode element is provided at least partially outside the enclosure and comprises a sample electrode surface for contacting a sample. The first and second electrode are electrically connected through the enclosure. Alternatively or additionally, a conductive connecting element defining a part of the enclosure and/or extending through the enclosure electrically connects the first electrode element and the second electrode element.

20 Claims, 12 Drawing Sheets

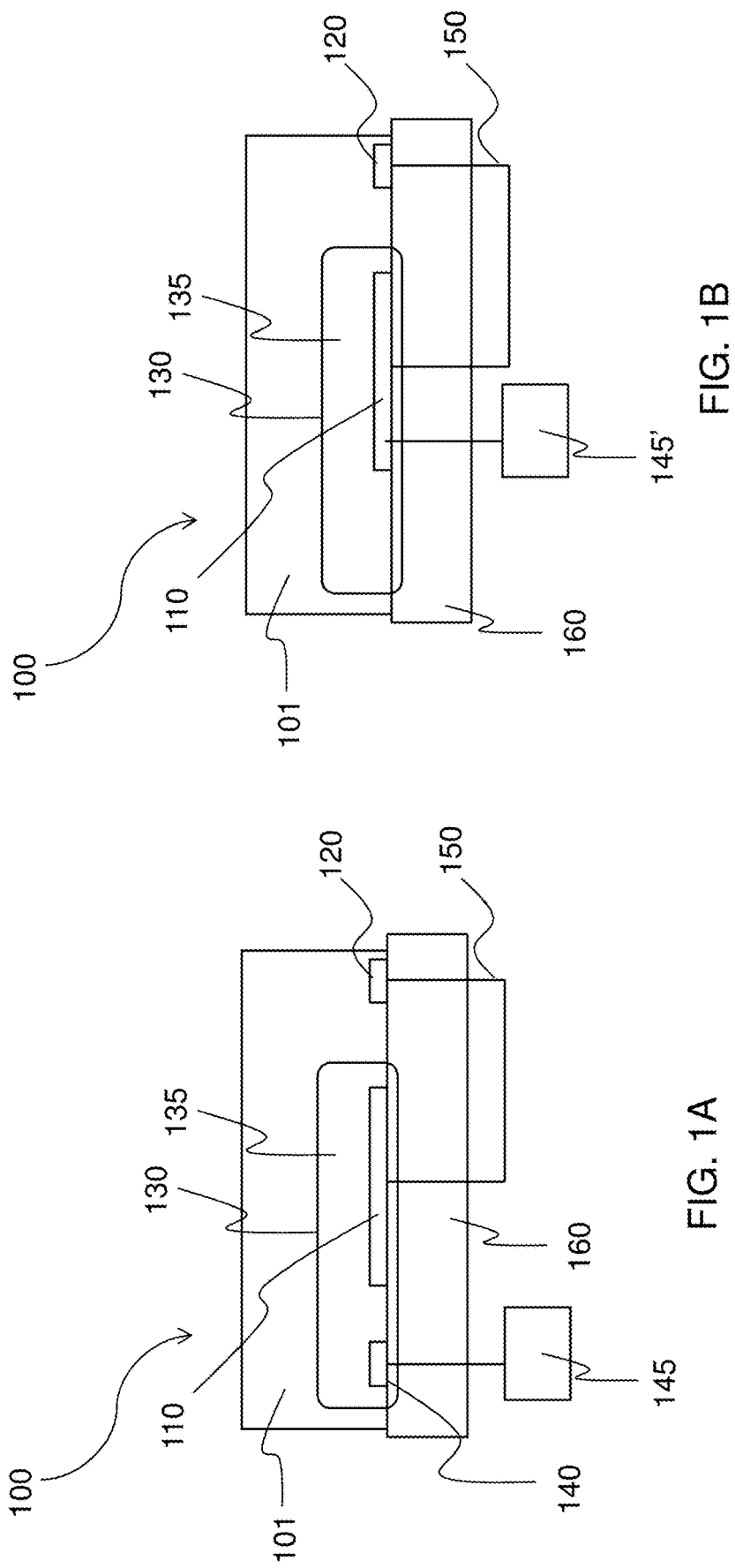

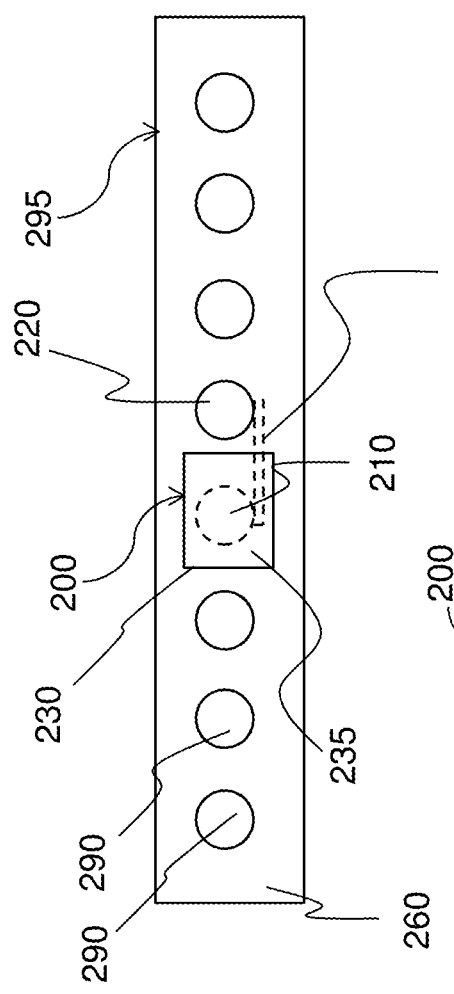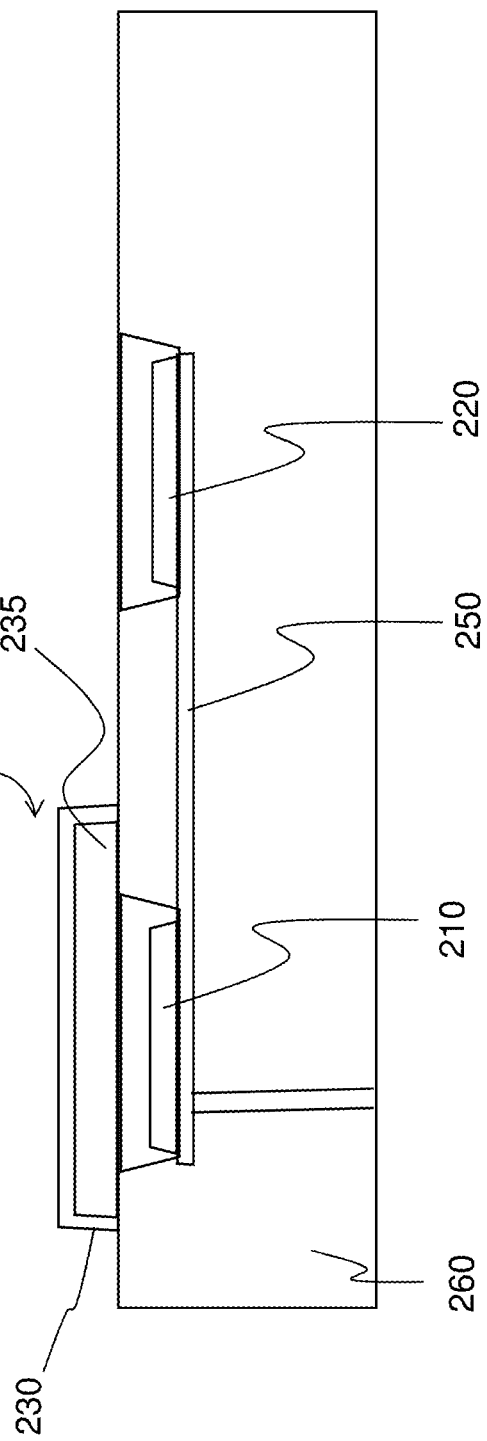

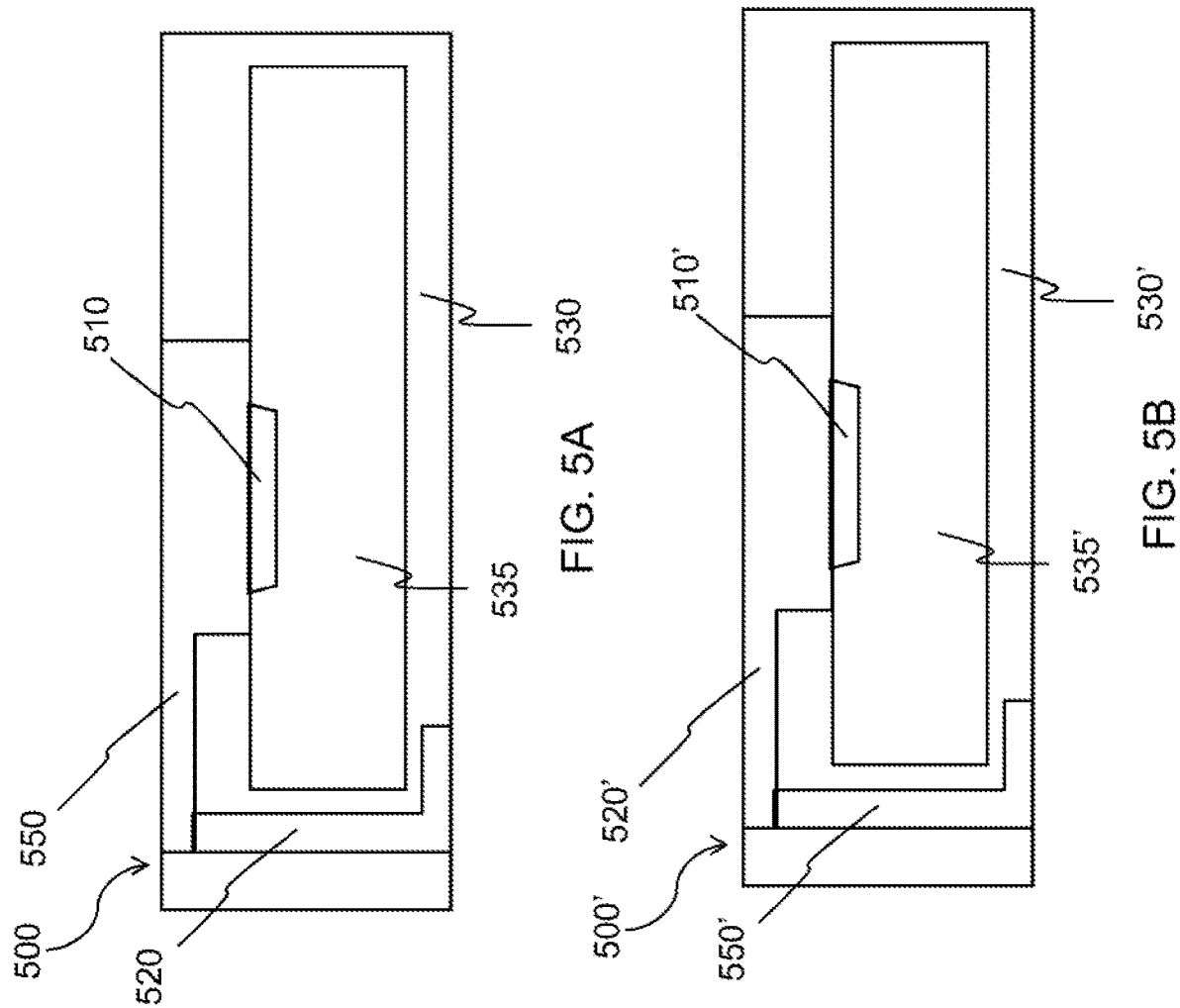

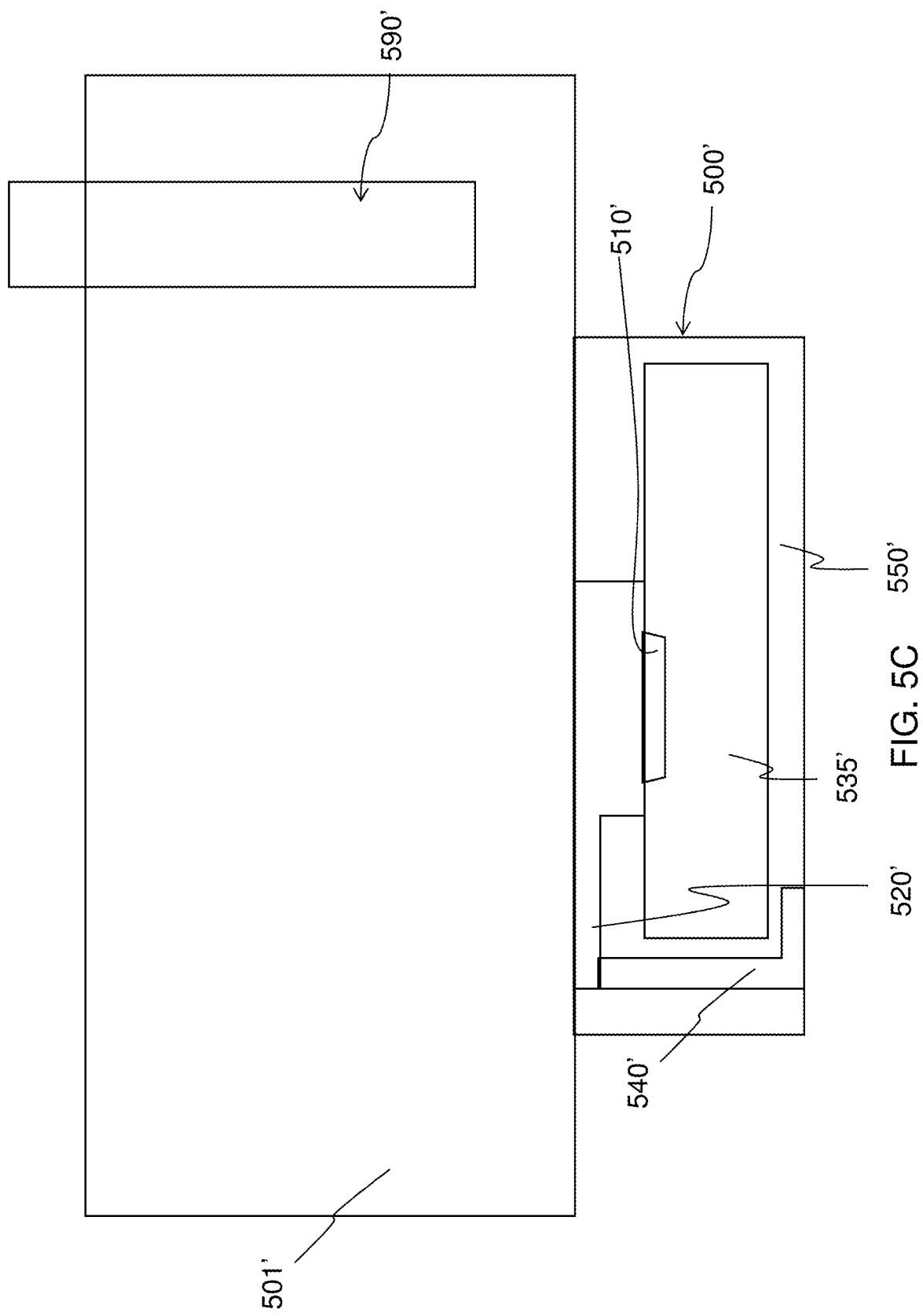

REFERENCE ELECTRODE

FIELD OF THE DISCLOSURE

This disclosure relates to a reference electrode for a sensor assembly, for example a biosensor, or chemical assay, a system comprising a reference electrode and method for determining a property of a sample.

BACKGROUND

Various sensor assemblies are known for determining properties of a sample. Electronic sensors can use electrodes to measure properties of a sample using electrodes. For example, electrochemical sensors can be used to detect the presence of particular analytes or measurements such as pH. These systems employ reference electrodes, which have a relatively stable and analyte-independent potential, to provide a benchmark against which the potential of a working electrode can be compared.

Reference electrodes typically comprise an enclosure in which a reference electrolyte (e.g., a reference solution) is held, an electrode immersed in the reference electrode solution and an interface with the sample that is to be measured. Where the sample and reference solution are both liquids, this can be a liquid-junction. Often, this sample and reference electrolytes will be separated by a frit (e.g., a porous member) and/or salt bridge. However, both frits and salt bridges have drawbacks. For example, frits allow some transfer of ions while limiting contamination of the reference electrolyte. However, leakage is common, leading to measurement inaccuracies over time, and reference electrodes often need to be replaced. These are also difficult to manufacture and are prone to blocking. Salt bridges are also very difficult to manufacture on a small scale and thus are not useful in micro-scale or small sensors and can also be prone to contamination.

It is therefore desirable to provide an improved reference electrode structure which provides a relatively stable potential while being easier to manufacture.

SUMMARY OF THE DISCLOSURE

The present disclosure provides a reference electrode with a liquid-impermeable enclosure comprising a chamber for a reference electrolyte. The reference electrode also comprises a first electrode element comprises a reference electrolyte electrode surface arranged to contact a reference electrolyte located within the chamber and a second (separate) electrode element is provided at least partially outside the enclosure and comprises a sample electrode surface for contacting a sample. The first and second electrode are electrically connected through the enclosure. Alternatively or additionally, a conductive connecting element defining a part of the enclosure and/or extending through the enclosure electrically connects the first electrode element and the second electrode element.

In one embodiment, a reference electrode comprises a liquid-impermeable enclosure comprising liquid-impermeable walls enclosing a chamber for receiving a reference electrolyte; a first electrode element comprising a reference electrolyte electrode surface arranged to contact a reference electrolyte located within the chamber; and a second electrode element provided outside the enclosure and comprising a sample electrode surface for contacting a sample, wherein the first, and second electrode elements are electrically connected through the enclosure.

In one embodiment, a system for determining a property of a sample comprises a sensing surface for contacting a sample and configured to provide a sample signal based on the interaction with the sample; and a reference electrode according to any of the embodiments disclosed herein, wherein the reference electrode is configured to provide a reference signal indicative of the potential of the reference electrode.

In one embodiment, a method for determining a property of a sample, comprises providing a sensor assembly comprising a sensing surface and a reference electrode, the reference electrode comprising a liquid-impermeable enclosure comprising liquid-impermeable walls enclosing a chamber, a first electrode element comprising a reference electrolyte electrode surface, a second electrode element provided at least partially outside the enclosure and comprising a sample electrode surface for contacting a sample matrix, the first, and second electrode elements being electrically connected through the enclosure; providing a reference electrolyte in the enclosure of the reference electrode such that the reference electrolyte electrode surface is in contact with the reference electrolyte; providing a sample to the sample electrode surface; and determining the property of the sample, based at least in part on sensor signals received from the sensor assembly.

BRIEF DESCRIPTION OF THE DRAWINGS

The present invention will now be described in more detail with reference to the accompanying drawings, which are not intended to be limiting:

FIG. 1A provides a schematic cross-sectional view of a reference electrode according to an embodiment;

FIG. 1B provides a schematic cross-sectional view of a reference electrode according to an embodiment;

FIG. 2A provides a schematic plan view of a reference electrode according to an embodiment;

FIG. 2B provides a schematic cross-sectional view of the reference electrode of FIG. 2A;

FIG. 5A provides a schematic cross-sectional view of a reference electrode according to an embodiment;

FIG. 5B provides a schematic cross-sectional view of a reference electrode according to an embodiment;

FIG. 5C provides a schematic cross-sectional view of a system comprising a reference electrode according to an embodiment;

DETAILED DESCRIPTION

Figure 3:
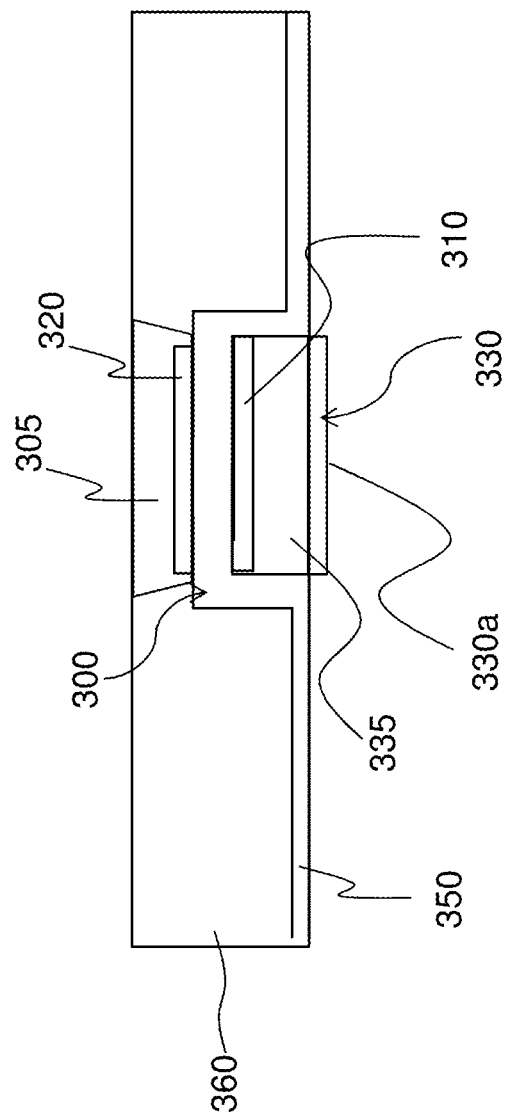
FIG. 3 provides a schematic cross-sectional view of a reference electrode according to an embodiment.

Various reference electrode configurations are known. However, conventional reference electrode designs suffer from drawbacks relating to contamination of the reference electrolytes used, requiring frequent replacement. There are also difficulties in miniaturizing these systems and conventional designs are not suited for mass-production, such as the semiconductor processing used for most of the remaining parts of modern sensor systems. Indeed, many of the reference electrodes most commonly used today are based on the same design principles created decades ago.

Reference electrodes typically comprise an enclosure in which a reference electrolyte is held, an electrode in contact with the reference electrolyte and an interface with the sample that is to be measured. These reference electrodes are configured such that the potential of the reference electrode is not influenced by (i.e. is independent of) the sample being measured by the sensor assembly.

With liquid samples and reference solutions (i.e. liquid reference electrolytes), the interface is usually an opening in the enclosure which forms a liquid-junction. Reference electrodes typically address liquid-junction potentials by using frits (e.g., porous membranes) or salt bridges.

Frits tend to be porous glasses or ceramics. This allows ion transfer across the frit, while attempting to minimize liquid (or fluid) transfer across the frit. However, due the porous nature of the frit, there is typically leakage of the reference electrolyte out of the enclosure (where a solution or gel is used) or contamination of the reference electrolyte by the sample. This leakage and contamination leads to e.g., drift of the potential of the reference electrode and thus inaccuracies in the measurement of the sensor system. Moreover, given the use of frits, which are essentially discrete porous members, manufacture on a small scale is very difficult.

Salt bridges can be used instead of or together with a frit, but by necessity are bulky incompressible liquids or, if scaled down in volume, provide limited benefits, or lifetime. As such, reference electrodes employing salt bridges are very difficult to manufacture on a small scale. These are often also used in conjunction with a frit and can themselves become contaminated.

There is increasing pressure to reduce the size of sensors. This includes electrical sensors, e.g., electrochemical sensors, of the sort employing these types of reference electrodes.

One configuration to address issues associated with frits is set out in U.S. Pat. No. 10,830,725 B2. However, the device disclosed therein can be difficult to manufacture using semiconductor processing techniques due to the unique shape of the metallic element. Moreover, the limitations on the shape and size of the metallic element also limits the functionality of the reference electrode and is thought to influence the robustness of the seal around the element.

The present disclosure provides a reference electrode with a liquid-impermeable enclosure comprising a chamber for a reference electrolyte. The reference electrode also comprises a first electrode element comprises a reference electrolyte electrode surface arranged to contact a reference electrolyte located within the chamber and a second (separate) electrode element is provided at least partially outside the enclosure and comprises a sample electrode surface for contacting a sample. The first and second electrode are electrically connected through the enclosure. Alternatively or additionally, a conductive connecting element defining a part of the enclosure and/or extending through the enclosure electrically connects the first electrode element and the second electrode element.

In one embodiment, a reference electrode comprises a liquid-impermeable enclosure comprising liquid-impermeable walls enclosing a chamber for receiving a reference electrolyte; a first electrode element comprising a reference electrolyte electrode surface arranged to contact a reference electrolyte located within the chamber; and a second electrode element provided outside the enclosure and comprising a sample electrode surface for contacting a sample, wherein the first, and second electrode elements are electrically connected through the enclosure.

Embodiments advantageously provide a reference electrode which provides a stable potential, yet foregoes the disadvantages associated with existing reference electrode designs.

The provision of the sealed enclosure in the form of the liquid-impermeable enclosure, with the first electrode element or part internally located within the enclosure or forming a part of the enclosure and the second electrode located externally to the enclosure, provides advantages over the conventional frit or salt bridge designs by reducing or eliminating the risk of leakage or contamination. In particular, the liquid-impermeable enclosure seals off the reference electrolyte and prevents egress of the reference electrolyte (e.g., flow of the electrolyte e.g., if a liquid solution or gel/polymer) out of the inner volume (i.e. chamber) or a sample (e.g., a sample solution) into the chamber and thereby avoiding contamination of the electrolyte, while the electrode elements, and the electrical connection still enable the device to function as a reference electrode.

As such, the first reference electrolyte electrode part and the reference electrolyte contained within the chamber are isolated from the sample. The 'reference electrolyte electrode surface' and electrolyte are not in contact with either the sample and may be sealed from the external environment by the enclosure. Thus, in some embodiments, the reference electrolyte electrode surface, and optionally the first electrode part, and the electrolyte are sealed inside the enclosure.

The provision of the two separate or discrete electrode elements or parts with the electrical connection providing the interconnection provides advantages over the conventional designs and arrangements in which metallic elements formed as a single electrode extend extending through a membrane. In particular, the claimed arrangement is significantly easier to manufacture and can be more robust. For example, by providing the electrode as two separate elements or parts with the elements on either side of the enclosure, these electrode parts can be manufactured and positioned in separate steps to one another and in a separate process to the enclosure. For example, these can be constructed using semiconductor manufacturing processes thereby allowing for scale up and smaller components and the positioning and manufacture of these does not depend on providing the enclosure around the part.

Moreover, this can also lead to more customizability and improved functionality. In particular, as the electrode elements are separate, they can be formed from different materials or by two different material configurations. This enables the tailoring of properties which would otherwise be more limited, such as ensuring that the potential is controlled by the reference electrolyte rather than a sample. For example, it is possible to provide high-surface area materials within the enclosure as the first electrode element and materials with a lower surface area as the second electrode element. By doing so, the potential is determined by the first electrode element since the potential is determined by the highest surface area electrode potential.

By liquid-impermeable enclosure it is meant a housing or container defined by liquid-impermeable walls which prevent liquid-ingress or substantially prevent liquid-ingress. Optionally the walls can be at least partly defined by one of the first electrode element or connecting element, within which is enclosed a chamber (i.e. an inner volume or void). A reference electrolyte can be provided within the chamber and is sealed from contaminants. The electrolyte may be provided with the reference electrode when manufactured, or may be added by a user later. Thus, the reference electrolyte electrode surface is arranged so that it can contact a reference electrolyte, when the reference electrolyte is received within the chamber. The liquid-impermeable enclosure/walls can be non-porous to prevent liquid-ingress. In some embodiments, the walls may be fluid-impermeable.

The reference electrode is thus an assembly of electrode parts which can be used in a sensor assembly to measure a property of a sample (examples include an analyte in a matrix), such as a sample solution. As noted above, the assembly comprises a liquid-impermeable (e.g., non-porous) enclosure or housing which is configured to hold a reference electrolyte. This may be configured to hold a reference solution (i.e. a liquid reference solution). A first reference electrolyte electrode element or part is provided within the enclosure housing so that it is in contact with a reference electrolyte located within the sealed housing. This can be a single surface of the electrode element or part, namely a reference electrolyte sensor surface, or may be the entire electrode element. A second, sample electrode element is external to the housing and is separated from the inner void so as to not contact the reference electrolyte. This is instead provided so as to be in contact with a sample. The sensor assembly may thus comprise a sample surface or chamber for receiving a sample external to the liquid-impermeable housing or enclosure and the second sample electrode may be located within the sample chamber, or in, or on the sample surface. The two electrode elements or parts are galvanically connected through the housing or enclosure, for example by a connecting element, such as by electrode part, a track, or a wire. The electrode parts are configured so that the reference electrode acts as a reference electrode and the potential of the reference electrode is substantially independent of the sample in which the second electrode part is in contact.

In an embodiment, the separate second electrode element is isolated from the chamber so as to not contact a reference electrolyte located within the chamber. In other words, the second electrode element is external to the chamber, such as located on the external side of the liquid-impermeable walls. This configuration can be particularly advantageous as the second electrode element is entirely separate to the reference electrode enclosure and thus can be located in an advantageous location for the sample. This also can improve the manufacturability, as the second electrode element can be manufactured separate to the enclosure.

In an embodiment, the reference electrode comprises a conductive connecting element extending between the first electrode element and the second electrode element so as to electrically connect the first electrode element and the second electrode element. That is, the electrical connection is provided by a conductive element that is separate to the first and second electrode elements. Such embodiments can be particularly advantageous as the galvanic connection can be provided by an element separate to the electrode elements. Such an element can be cheaper and easier to manufacture as compared to the electrode elements. For example, such a connecting element can be a track or wire. In alternative embodiments, the electrical connection could be provided by one or more of the first or second electrode elements.

In certain embodiments, the first electrode element is located within the chamber; and wherein the conductive connecting element extends through the liquid-impermeable walls of the enclosure to electrically connect the first electrode element and the second electrode element. Thus, the first electrode element can be contained within the liquid-impermeable chamber (i.e. surrounded by the wall(s)) and the second electrode element can be fully isolated outside the chamber or enclosure.

In certain embodiments, the first electrode element is provided as a first layer and the connecting element is provided as a second layer arranged on or below the second layer. These may be in direct contact with one another in a layered structure. This can provide an arrangement which is easier to manufacture since the elements can each be provided in a stack or layered arrangement and formed using well-optimized manufacturing techniques. This can also improve ease of manufacture and improve the seal between any part extending through the enclosure. The first electrode element and connecting elements can, for example, be formed using semiconductor processing techniques. In one specific embodiment, the first electrode element has a rear surface opposite the reference electrolyte electrode surface and the connecting element is connected to the rear surface. In a further embodiment, the second electrode element is provided as a third layer arranged on or below the second layer. These may also be in direct contact with one another in a layered structure.

In certain embodiments, the first electrode element defines at least a part of the liquid-impermeable walls of the enclosure and is arranged so that the reference electrolyte electrode surface faces into the chamber. This arrangement can reduce size requirement for the enclosure, can be easier to manufacture and can provide a high-surface area for the reference electrolyte electrode surface.

In certain embodiments, the connecting element defines at least a part of the liquid-impermeable walls of the enclosure. The first electrode part can be provided on the connecting element. In such embodiments, this can provide an easier to manufacture structure and the connecting element can serve as two parts of the device (i.e. a part of the enclosure and a conductive element).

In certain embodiments, the reference electrode further comprises a substrate, wherein the substrate defines at least a part of the liquid-impermeable walls of the enclosure. This can be advantageous as the substrate can serve as a base for the remaining components to be formed thereon, such as during a semiconductor manufacturing process. The substrate can be formed of any suitable non-conductive (electrically), or substantially non-conductive, material. In some embodiments, the substrate may comprise silicon, a glass, a glass-ceramic, a ceramic, polymer (e.g., injection molded plastic), a laminate (e.g., a glass-woven polymeric laminate, such as a glass-woven epoxy laminate (e.g., FR4)), or combinations thereof. In some embodiments, the substrate may be a silicon, glass, glass-ceramic, ceramic, polymeric (e.g., injection molded plastic), or a laminate (e.g., a glass-woven polymeric laminate, such as a glass-woven epoxy laminate (e.g., FR4)) substrate. In some embodiments, the substrate can be a silicon substrate or a polymeric substrate. In an embodiment, the first and/or second electrode elements are provided on or in the substrate.

In embodiments where the reference electrode comprises a conductive connecting element extending between the first electrode element and the second electrode element so as to electrically connect the first electrode element and the second electrode element, further embodiments may include the conductive connecting element extending on and/or through the substrate to electrically connect the first and second electrode elements. This can make the device more robust by forming the electrical connection through the substrate rather than through any other part of the enclosure (e.g., a membrane) and reduces the risk of damage at the seal between the parts. This also improves manufacturability as the formation of electrical connections in substrates is well-optimized as compared to providing metallic elements through membranes. Moreover, the enclosure can be sealed against the substrate, which can be more reliable. For example, embodiments may comprise a substrate comprising a metal track provided on the substrate or extending through the substrate (e.g., through a through via). In embodiments where the first and/or second electrode element provides the electrical connection, the respective part(s) providing the electrical connection can extend on and/or through the substrate.

In embodiments, the substrate, and the first electrode element together at least partially define the liquid-impermeable walls of the enclosure. In additional or alternative embodiments where the reference electrode comprises a conductive connecting element extending between the first electrode element and the second electrode element so as to electrically connect the first electrode element and the second electrode element, the substrate, and the connecting element together at least partially define the liquid-impermeable walls of the enclosure.

In certain embodiments, the substrate comprises the liquid-impermeable chamber. This can provide a more straightforward method of manufacture and provides a structure that lends itself to semiconductor manufacturing processes. Formation of other parts on the substrate can be easier and essentially provide an integrated circuit. This can create a stronger seal around the parts (e.g., the enclosure is better sealed) than would otherwise be obtainable with discrete parts adhered together.

In certain embodiments, the reference electrode comprises a liquid-impermeable membrane provided on the substrate, the liquid-impermeable membrane, and the substrate together at least partially defining the liquid-impermeable walls of the enclosure. This allows for the manufacture of the substrate, and any other parts on the substrate (e.g., the electrode elements) followed by the formation of the chamber by providing a membrane over a part of the substrate.

In certain embodiments, the first, and second electrode elements are spaced apart. For example, so as to be electrically separated and galvanically or conductively connected by the conductive connecting element.

As noted above, by virtue of the reference electrode being a reference electrode, it is configured so that the potential is stable and substantially independent of the sample (e.g., the sample solution). The reference electrode is instead configured so that the electrode formed by the first and second electrode parts is primarily influenced by the reference electrolyte within the chamber and not the sample.

This can be achieved, for example, by configuring the reference electrode such that the first electrode element is configured to have a first capacitance; wherein the second electrode element is configured to have a second capacitance; and wherein the first capacitance is greater than the second capacitance.

In certain embodiments, this can be achieved by the surface area of the reference electrolyte surface of the first electrode element being at least five times greater than the surface area of the sample surface of the second electrode element. For example, the surface area of the first electrode element may be at least ten times greater than the surface area of the second electrode element, for example at least 25 times greater, for example at least 100 times greater. This may be up to 10000 times higher, or greater. This can provide the first electrode part with a higher capacitance than the first capacitance and any stray or parasitic capacitances. High-surface area conductive materials (such as nanostructured metals, (e.g., Pt or Carbon Black, Pt/Au/Ag nanoparticles, CNTs, graphene) can have surface areas of at least 10 times higher (up to 10000 times higher, or more) surface area than plain metal surfaces, resulting in proportional increase in capacitance of the electrodes to the electrolyte (through formation of the double layer). This is advantageous as these materials can be used to produce electrodes which take up the same or similar surface area on the substrate, while having a significantly different capacitance. These may be electrodes functionalized with such high-surface area materials.

In some embodiments, the surface area can be determined by surface absorption of an inert gas, such as nitrogen, or helium. This is particularly where the electrode element(s) is/are formed from a powder or porous material. In one embodiment, the surface area is a Brunauer-Emmett-Teller (BET) surface area determined by surface absorption of nitrogen. In one embodiment, this can be measured according to ASTM D6556-21 (2021) Standard Test Method for Carbon Black—Total and External Surface Area by Nitrogen Adsorption. In one embodiment, this can be measured by ASTM D3663-20 (2020) Standard Test Method for Surface Area of Catalysts and Catalyst Carriers. In other embodiments, this can be measured using electrode capacitance measurement in an electrolyte (through EIS—electrochemical impedance spectroscopy, for instance).

In one embodiment, the first electrode element comprises a porous or nanostructured material (i.e. having a surface comprising nanometer (1-100 nm) sized elements located therein, such as ridges, protrusions or valleys) so as to provide the electrode with a high-surface area relative to the second electrode element.

Alternatively or additionally, this can be achieved by the first electrode element comprising a first electrode material and the second electrode element comprising a second electrode material, the first, and second electrode materials being different. The first electrode element can be selected from a high capacitance material (i.e. higher capacitance than that of the second electrode element) so that the potential of the reference electrode is independent of the sample in which the sample surface of the second electrode element is immersed.

Alternatively or additionally, this can be achieved by providing a strong redox couple reaction for the electrode in the reference electrolyte, while keeping the electrode in the sample at potential away from any redox reactions in the sample. For example, the first electrode element may be provided with a redox couple reaction that is higher than the second electrode element. By ensuring that this is achieved, the first electrode element, and reference electrolyte will determine the potential of the reference electrode.

In certain embodiments, the first electrode element may be formed from or comprise metals, metal oxides, metal nitrides, carbon-based materials, a conductive polymer, or combinations thereof. In certain embodiments, the first electrode element comprises a first electrode material selected from platinum, platinum black, carbon black, carbon nanotubes, or combinations thereof. In some embodiments, the first electrode element is formed (i.e. consists essentially of) the aforementioned materials.

In certain embodiments, the second electrode element may be formed from or comprise metals, metal oxides, metal nitrides, carbon-based materials, or combinations thereof. In certain embodiments, the second electrode element comprises a second electrode material selected from gold, silver, copper, platinum, a conductive polymer, or a combination thereof. In some embodiments, the second electrode element is formed (i.e. consists essentially of) the aforementioned materials.

In certain embodiments, the conductive connecting element comprises a conductive track or wire. In certain embodiments, the conductive connecting element comprises a conductive material selected from a metal, metal oxides, metal nitrides, carbon-based materials, a conductive polymer, or a combination thereof.

In some embodiments, the liquid-impermeable walls of the enclosure are formed from or comprise a material selected from polymers, glass, glass-ceramics, ceramics, laminates, metals, silicon, or combinations thereof. Where the enclosure comprises a substrate, the substrate may be a silicon substrate. Where the enclosure comprises a membrane, the membrane may be formed from or comprise a polymer.

In certain embodiments, the reference electrode further comprises a reference electrolyte provided in the enclosure (i.e. within the chamber defined by the enclosure), wherein the reference electrolyte electrode surface of the first electrode element is in contact with the reference electrolyte. The reference electrolyte (i.e. electrolyte in contact with 'second surface') may be any liquid, gel or solid (e.g., polymer) electrolyte. For example it may be a salt in water (e.g., 3M KCl, PBS), it may be an acid (e.g., sulfuric acid) or base, an organic electrolyte (e.g., organic salts in organic solvents); Oxidation-Reduction Potential (ORP) solutions (Ferri-, Ferro-redox solution, Ruthenium-based ORP, etc.); gels (agarose gels, cellulose gels, PVA gels, etc.); solid-state electrolytes, conducting polymers, ionic liquids, etc. In some embodiments, the reference electrolyte is a reference solution such that the enclosure is for receiving a reference solution.

The reference electrode as is disclosed herein, further comprising a third reference electrode element arranged to contact a reference electrolyte located within the chamber and comprising an exposed external contact so as to be electrically connectable to an external system. This can accordingly be an addressable element within the reference electrode enclosure. This can be used as a means to measure the potential of the reference electrode, as opposed to having a contact in contact with the first electrode element. This can be any conductive element, such as a metal, metal oxide, or metal nitride.

In one embodiment, a reference electrode comprises a liquid-impermeable enclosure comprising liquid-impermeable walls enclosing a chamber for receiving a reference electrolyte; a first electrode element comprising a reference electrolyte electrode surface arranged to contact a reference electrolyte located within the chamber; a second electrode element provided outside the enclosure and comprising a sample electrode surface for contacting a sample; and a conductive connecting element defining a part of the enclosure and/or extending through the enclosure to electrically connect the first electrode element and the second electrode element.

In one embodiment, a system for determining a property of a sample comprises a sensing surface for contacting a sample and configured to provide a sample signal based on the interaction with the sample; and a reference electrode as is disclosed herein, wherein the reference electrode is configured to provide a reference signal indicative of the potential of the reference electrode.

By provide it is meant that it can be addressed to provide a reading. The sample signal may also be indicative of a potential. The sensor signals may comprise signals from the working electrode, reference electrode and/or counter electrode, where present.

The reference electrode set out herein can therefore be used as part of a system for measurement of an analyte property. For example, this can be as a reference electrode in a system or method for the determination of pH (determination of the −log 10 molar concentration of $H^+$ ions) or analyte concentration. The terms "analyte concentration" or "concentration of the analyte" as used herein may, in certain embodiments, refer to the activity of the analyte. The system may therefore further comprise a working electrode and a counter electrode. The sensing surface can be an electrode (e.g., a working electrode) and may therefore also further comprise a counter electrode.

The system may be configured to receive a signal from the reference electrode providing an indication of (or a property indicative of) the potential at the reference electrode and, indeed, the other electrodes in the system. The system may further comprise a property determination unit for determining the property that is being measured based on the processed signals. These may take the form of one processor, for example, or may be comprised of several processors. A processor may be implemented in any suitable manner, with software and/or hardware, to perform the various functions required. One or all of the units may, for example, employ one or more microprocessors programmed using software (for example, microcode) to perform the required functions. Examples of processor components that may be employed in various embodiments of the present disclosure include, but are not limited to, conventional microprocessors, application specific integrated circuits (ASICs), and field-programmable gate arrays (FPGAs).

In various implementations, the signal processing unit, property determination unit and/or processor may be associated with one or more non-transitory storage media such as volatile and non-volatile computer memory such as RAM, PROM, EPROM, and EEPROM. The non-transitory storage media may be encoded with one or more programs that, when executed on one or more processors and/or controllers, perform the required functions. Various storage media may be fixed within a processor or controller or may be transportable, such that the one or more programs stored thereon can be loaded into the signal processing unit, property determination unit and/or processor.

In some non-limiting examples, the system includes a user interface, such as a display, for communicating the analyte property determined by the property determination unit. Alternatively or additionally, the system may include a communications interface device, such as a wireless transmitter, configured to transmit the analyte concentration determined by the property determination unit to an external device, such as a personal computer, tablet, smartphone, remote server, etc.

In one embodiment, a method for determining a property of a sample, comprises providing a sensor assembly comprising a sensing surface and a reference electrode, the reference electrode comprising a liquid-impermeable enclosure comprising liquid-impermeable walls enclosing a chamber, a first electrode element comprising a reference electrolyte electrode surface, a second electrode element provided at least partially outside the enclosure and comprising a sample electrode surface for contacting a sample matrix, the first, and second electrode elements being electrically connected through the enclosure; providing a reference electrolyte in the enclosure of the reference electrode such that the reference electrolyte electrode surface is in contact with the reference electrolyte; providing a sample to the sample electrode surface; and determining the property of the sample, based at least in part on sensor signals received from the sensor assembly.

The method may utilise any of the reference electrode or systems disclosed herein. In these methods, the step of providing the reference electrolyte may be part of the step of providing the sensor assembly or the reference electrode. That is, these may be provided as a single unit.

FIG. 1A provides a schematic cross-sectional view through a reference electrode 100. The reference electrode 100 comprises a first electrode element 110 located within a liquid-impermeable enclosure 130 containing a reference electrolyte 135 (in this embodiment, a reference solution 135), a second electrode element 120 located outside the enclosure 130, and a conductive connecting element 150 galvanically connecting the first electrode element 110 to the second electrode element 120.

The first and second electrode elements 110, 120 of the reference electrode 100 are provided as two separate elements. The first electrode element 110 is wholly contained within the enclosure so as to provide a reference solution electrode surface in contact with the reference solution 135 provided within the enclosure 120. The second electrode element 120 is isolated from the reference solution 130 by liquid-impermeable walls of the enclosure 130 so that it is separate from the reference solution 135. The second electrode element 120 is in contact with an analyte solution. In this embodiment, the first electrode element 110 has a greater surface area (25 times greater) than the second electrode element 120. In this way, the potential of the reference electrode 100 is independent of the sample solution 101 and therefore the reference electrode 100 provides a stable potential.

In this embodiment, the first and second electrode elements 110, 120 are provided on an upper surface of a substrate 160. This allows the electrode elements 110, 120 to be formed using semiconductor processing techniques on the substrate 160 enabling the reference electrode 100 to be produced by mass-production techniques. A membrane is then formed over the substrate to provide the enclosure 130. The conductive connecting element 150 extends from the underside of the first electrode element 110 through the substrate 160 to the second electrode element 120. This too can be formed using semiconductor processing techniques, for example by forming a through via extending through the substrate 160. This is particularly advantageous because, due to the conductive element 150 extending through the substrate 160, the substrate 160 provides a more robust seal around the conductive element reducing the likelihood of leakage of the reference solution 135 out of the enclosure 130.

The reference electrode 100 also comprises a further electrode element 140 located within the enclosure 130. This can be connected to an external system (e.g., a signal processing unit (not shown)) such that the potential of the reference electrode 100 can be determined.

By providing part of the reference electrode 100 structure within a sealed enclosure 130 there are significant advantages over reference electrodes 100 which rely on frits and/or salt bridges to separate reference solutions from sample solutions. In particular, the use of the enclosure 130 reduces the risk of leakage or contamination of the reference solution 130. This increases the stability and lifetime of the reference electrode 100.

FIG. 1B provides a schematic cross-sectional view through a variation of the reference electrode 100 shown in FIG. 1A. The reference electrode 100 of FIG. 1B includes all of the same components in the same configuration as FIG. 1A with the exception of the omission of the third electrode element 140 within the enclosure 130. Instead, in this embodiment, the external system (e.g., a signal processing unit (not shown)) will electrically connect to the first electrode element 110 such that the potential of the reference electrode 100 can be determined.

FIG. 2A provides a plan view of a sensor array 295 comprising a substrate 260 on which are provided a number of working electrodes 290 in an array and a reference electrode 200. FIG. 2B shows a cross-sectional view of the reference electrode 200 part of the sensor array 295 (i.e. with the other working electrodes 290 omitted). The substrate 260 can be provided in a sample fluid (not shown) to measure a number of different analyte properties simultaneously. For example, the working electrodes 290 can be used to determine conductivity, pH, concentration of ions, and detection of particular biomolecules (e.g., using aptamers).

In this embodiment, the substrate 260 is formed with a number of electrode regions (not labeled) on which the working electrodes 290 are formed. Vias extend through the substrate 260 so that the working electrodes 290 can be connected to a signal processing unit. The reference electrode 200 is also provided on the substrate 260 within the structure. In particular, the reference electrode 200 comprises a first electrode element 210 located on one of the electrode regions (instead of a working electrode) and the second electrode element 220. This configuration allows for easier production of customizable and scalable sensor arrays.

The reference electrode 200 in this embodiment is formed by providing a membrane over the first electrode element 210 to provide an enclosure 230 containing the first electrode element 210 and a reference solution in contact with an upper surface (reference solution electrode surface) of the first electrode element 210. The second electrode element 220 is located outside of the enclosure 230 and the upper surface (sample solution electrode surface) will be in contact with the sample solution in use. The first and second electrode elements 210, 220 are connected by a conductive connecting element 250. In this embodiment, this is formed by a conductive track which extends from the first electrode element 210 to the second electrode element 220 through the substrate 260.

In this embodiment, the first and second electrode elements 210, 220 occupy the same space on the substrate 260. However, the materials used provide the electrode elements 210, 220 provide a sufficient difference in capacitance so that the reference electrode 200 functions as a reference electrode 200 with a potential that is independent of the sample solution. In particular, in this embodiment, the first electrode element 210 is formed of carbon black and the second electrode element 220 is formed of platinum. It will be appreciated that other materials and combinations of materials can be used to provide the same effect. For example, the first electrode element 210 can be formed of platinum, carbon black, carbon nanotubes and the second electrode element 220 can be formed of platinum (with a different surface are), gold, or conductive plastic.

It will be appreciated that various modifications can be made to the above reference electrode structures. For example, the reference electrode 200 of FIGS. 2A and 2B may be reconfigured so that the electrical connection 250 extends to the front face and/or the enclosure 230 may located within the substrate 260 with, for example, a rear opening for filling the enclosure 230 with a reference solution 235, which opening is then sealed with a membrane (e.g., a non-conductive substrate, sealant tape, a polymer, epoxy, or a silicon cap, for example).

FIG. 3 provides a schematic cross-sectional view through a reference electrode 300 according to another embodiment. The reference electrode 300 comprises a substrate defining a sample collection region 305 for receiving a fluid to be analyzed. The reference electrode 300 also comprises a first electrode element 310 located within a liquid-impermeable enclosure 330 containing a reference solution 325, a second electrode element 320 located outside the enclosure 330 and located at the base of the sample receiving region 305 and a conductive connecting element 350 galvanically connecting the first electrode element 310 to the second electrode element 320. Although not shown, such a reference electrode 300 can be used in a sensor array 295 such as that shown in FIG. 2.

In this embodiment, the reference electrode is provided in a substrate 360 onto which the layers of each component are formed. The substrate 360 includes a recessed sample receiving chamber 305, the base of which is formed of the second electrode element 320 such that a sample received within the receiving chamber 305 will contact the second electrode element 320. The second electrode element 320 is a layer provided on top of the conductive connecting element 350, which in this embodiment is a layer of a conductive material extending along the width of the substrate 360 so as to provide electrical contact points at either edge of the substrate 360. Below the conductive connecting element 350 is a layer forming the first electrode element 310. The conductive connecting element 350 is thus formed on the first electrode element (or the other way around).

In this embodiments, the enclosure 330 is defined by the shape of the substrate 360 and the conductive connecting member 350, which define a recess with an opening, and a sealing member 330a provided over the opening of the recess to provide the liquid-tight enclosure 330. Within this is received a reference solution 335.

Such a structure lends itself to semiconductor processing as each part can be formed as a layer on a substrate 360.

FIGS. 4A-4D show a plan view of schematic images of the parts used in the manufacturing process for a reference electrode 400 according to the invention using semiconductor processing techniques and an associated method. Advantageously, the reference electrodes of the present application lend themselves to semiconductor manufacture, at least because they allow for the formation of optimized electrodes for the internal reference solution electrode (i.e. the first, reference solution electrode element) and external electrode (i.e. the second, sample facing electrode element). In embodiments where a connecting element is used to interconnect the two electrode elements, this is particularly so as the connecting track can be formed in a more robust manner and location which does not require consideration of the electrode elements size or shape. Examples of semiconductor processing techniques can be found in US 2018/059044 and US 2019/195825 (both assigned to Analog Devices Global), both of which are incorporated herein by reference.

Figure 4B:
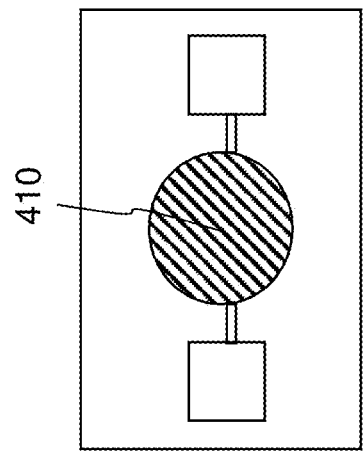
FIGS. 4A to 4D provide schematic plan views of parts used in the manufacture of a reference electrode.
Figure 4D:
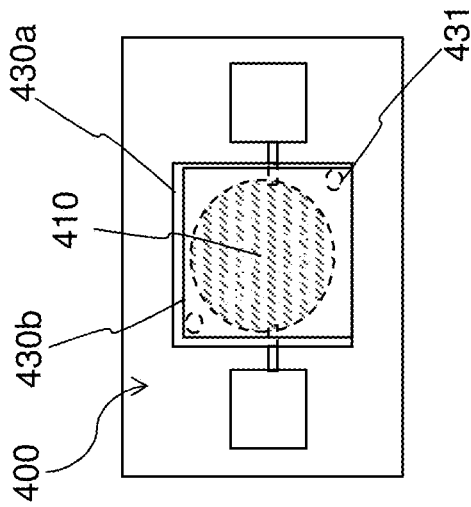
Figure 4A:
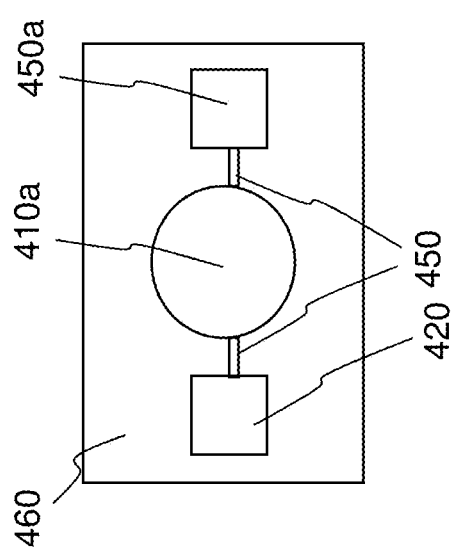

In FIG. 4A, a substrate 460 is provided and parts are formed on the substrate 460. In this embodiment, the substrate 400 can be a sensor die based e.g., on silicon or glass. The method comprises as a first step forming the following parts on the substrate: an exposed metal electrode 420 (e.g., formed of Au or Pt) forming the second electrode element 420 provided on one end of the substrate 460; a second exposed metal electrode 450a (e.g., formed of Au or Pt) for electrical contact (e.g., wirebonding) to the external system; a central exposed metal electrode 410a (e.g., formed of Au or Pt) located between the second electrode element 420 and the second exposed metal electrode 450a; and a metal track 450 under passivation extending between the second electrode element 420 and the second exposed metal electrode 450a underneath the central exposed metal electrode 410a so as to electrically connect each of these parts.

The method further comprises forming the first electrode element 420 on top of the central exposed metal electrode 410a, as shown in FIG. 4B. In some embodiments, this can be achieved by printing, dispensing, forming (e.g., by chemical vapor deposition (CVD) or otherwise) a material. For example, in some embodiments, this could be achieved by applying Pt black ink to the surface to cover the exposed central metal electrode 410a to form the first electrode element 410.

The method further comprises additional liquid-impermeable walls 430a to begin forming the enclosure 430. In this embodiment, the liquid-impermeable walls 430a form a part of the enclosure together with the substrate 460. The liquid-impermeable walls 430a can be a silicon or glass cap, for example, which lends itself to semiconductor processing methods. This cap 430a may be attached to the substrate 460, for example by bonding the cap 430a using a glass frit or epoxy/adhesive.

Figure 4C:
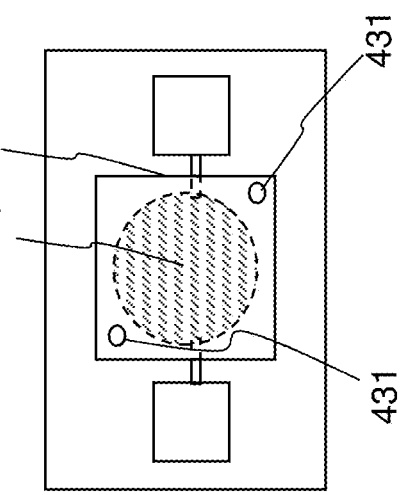

In embodiments where the reference electrolyte is a liquid or polymer/gel, the cap 430a may be provided with apertures 431 allowing the filling of the enclosure 430 with the reference electrolyte (see FIG. 4C). This can then be sealed with an additional sealing member 430b, as depicted in FIG. 4D thus forming the reference electrode 400.

Although a specific method has been shown with reference to FIGS. 4A to 4D, it will be appreciated that other method steps could be present or steps could be omitted. For example, in the case of a solid electrolyte (polymer or gel), this could be formed on top of the first electrode element 410 prior to providing the cap 430a. In such a case, there would be no need for the holes 431, for example.

Two further embodiments are shown in FIGS. 5A and 5B, which provide schematic cross-sectional views of two reference electrodes 500, 500'. Each reference electrode comprises an enclosure 530, 530' containing a reference solution 535, 535', a first electrode element 510, 510' provided within the enclosure 510, 510' so as to provide a reference solution electrode surface in contact with the reference solution 535, 535', a second electrode element 520, 520' and a conductive connecting element 550, 550'.

The two embodiments differ in the particular configuration of the parts. In the embodiment of FIG. 5A, the reference electrode 500 is configured so that a sample contacts the underside of the reference electrode 550. In particular, the second electrode element 520 is provided exposed to the underside and extends through the enclosure 550 to contact the conductive connecting element 550 which extends along the top of the enclosure 550 connecting the first and second electrode elements 510, 520. At least a portion of the connecting element 550 is in contact with the reference solution 535 and thus defines a part of the enclosure 550.

In the embodiment of FIG. 5B, the structure, and materials can remain the same, but the reference electrode 500' is reconfigured such that the top surface of the reference electrode 500' acts as the sample receiving surface. In particular, in this embodiment, the first electrode element 510' is directly in contact with the second electrode element

520'. The reference electrode 500 further includes a conductive connecting element 550' which extends through the enclosure 550' to allow electrical connection of the second electrode element 520' to an external system. In this embodiment, as a result of the structure, the second electrode element 520' can be in contact with the reference solution 535'. In this embodiment, the second electrode element 520' defines a part of the enclosure.

Figure 11:
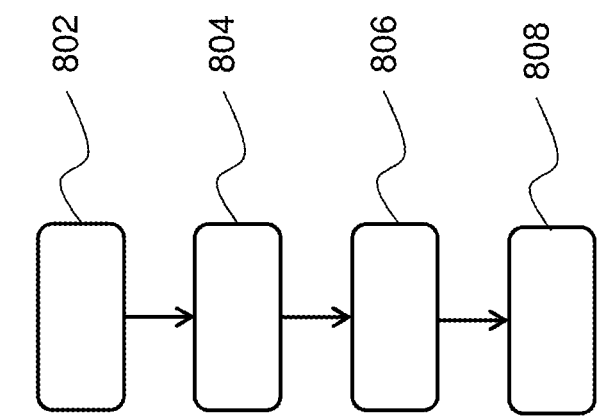
FIG. 11 provides a schematic view of a method according to an embodiment.

FIG. 11 depicts a method of determining a property of a sample 800. The method comprises providing (802) a sensor assembly comprising a sensing surface and a reference electrode, the reference electrode comprising a liquid-impermeable enclosure comprising liquid-impermeable walls enclosing a chamber, a first electrode element comprising a reference electrolyte electrode surface, a second electrode element provided at least partially outside the enclosure and comprising a sample electrode surface for contacting a sample matrix, the first, and second electrode elements being electrically connected through the enclosure.

The method further comprises providing (804) a reference electrolyte in the enclosure of the reference electrode such that the reference electrolyte electrode surface is in contact with the reference electrolyte. This may be a separate step to that of providing (802) the other components of the reference electrode, or may be carried out simultaneously.

The method further comprises providing (806) a sample to the sample electrode surface and determining (808) the property of the sample, based at least in part on sensor signals received from the sensor assembly.

Select Examples

Example 1 is a reference electrode, comprising: a liquid-impermeable enclosure comprising liquid-impermeable walls enclosing a chamber for receiving a reference electrolyte; a first electrode element comprising a reference electrolyte electrode surface arranged to contact a reference electrolyte located within the chamber; and a second electrode element provided at least partially outside the enclosure and comprising a sample electrode surface for contacting a sample, wherein the first, and second electrode elements are electrically connected through the enclosure.

In Example 2, the reference electrode of Example 1, can optionally include, wherein the second electrode element is isolated from the chamber so as to not contact a reference electrolyte located within the chamber.

In Example 3, the reference electrode of Example 1 or Example 2, can optionally include, wherein the reference electrode comprises a conductive connecting element extending between the first electrode element and the second electrode element so as to electrically connect the first electrode element and the second electrode element.

In Example 4, the reference electrode of Example 3, can optionally include, wherein the first electrode element is located within the chamber; and wherein the conductive connecting element extends through the liquid-impermeable walls of the enclosure to electrically connect the first electrode element and the second electrode element.

In Example 5, the reference electrode of Example 3 or Example 4, can optionally include, wherein the first electrode element is provided as a first layer and the conductive connecting element is provided as a second layer arranged on the second layer.

In Example 6, the reference electrode of Example 5, can optionally include, wherein the second electrode element is provided as a third layer arranged on the second layer.

In Example 7, the reference electrode of any one or more of Examples 1-6, can optionally include wherein the first electrode element defines at least a part of the liquid-impermeable walls of the enclosure and is arranged so that the reference electrolyte electrode surface faces into the chamber; and/or wherein the conductive connecting element defines at least a part of the liquid-impermeable walls of the enclosure.

In Example 8, the reference electrode of any one of more of Examples 1-7 can optionally include, a substrate, wherein the substrate defines at least a part of the liquid-impermeable walls of the enclosure.

In Example 9, the reference electrode of Example 8, can optionally include wherein the first and second electrode elements are each provided on or in the substrate.

In Example 10, the reference electrode of Example 8 or Example 9, can optionally include, wherein the reference electrode comprises a conductive connecting element extending between the first electrode element and the second electrode element so as to electrically connect the first electrode element and the second electrode element; and wherein the conductive connecting element extends on and/or through the substrate to electrically connect the first and second electrode elements.

In Example 11, the reference electrode of any one of Examples 8 to 10, can optionally include, wherein the substrate and the first electrode element together at least partially define the liquid-impermeable walls of the enclosure; and/or wherein the reference electrode comprises a conductive connecting element extending between the first electrode element and the second electrode element so as to electrically connect the first electrode element and the second electrode element and wherein the substrate and the conductive connecting element together at least partially define the liquid-impermeable walls of the enclosure.

In Example 12, the reference electrode of any one of Example 8 to 11, can optionally include, wherein the reference electrode comprises a liquid-impermeable membrane provided on the substrate, the liquid-impermeable membrane, and the substrate together at least partially defining the liquid-impermeable walls of the enclosure.

In Example 13, the reference electrode of any one of Examples 1-12, can optionally include, wherein the surface area of the reference electrolyte surface of the first electrode element is at least five times greater than the surface area of the sample surface of the second electrode element.

In Example 14, the reference electrode of any one of Examples 1-13, can optionally include, wherein the first electrode element comprises a first electrode material and the second electrode element comprises a second electrode material; and wherein the first and second electrode materials are different.

In Example 15, the reference electrode of any one of Examples 1-14, can optionally include, wherein the first electrode element comprises a first electrode material selected from platinum, platinum black, carbon black, carbon nanotubes, or a combination thereof.

In Example 16, the reference electrode of any one of Examples 1-15, can optionally include, wherein the second electrode element comprises a second electrode material selected from silver, platinum, a conductive polymer material, or a combination thereof.

In Example 17, the reference electrode of any one of Examples 3-16, wherein the connecting element comprises a conductive track or wire.

Example 18 is a system for determining a property of a sample, comprising: a sensing surface for contacting a sample and to provide a sample signal based on the interaction with the sample; and a reference electrode according to any one of Examples 1-17, wherein the reference electrode is to provide a reference signal indicative of the potential of the reference electrode.

In Example 19, the system of Example 18, can optionally include, a signal processing unit to process the sample signal and reference signal received; and a property determination unit to, based at least in part on the sample signal and reference signal processed by the signal processing unit, determine the property of the sample.

Example 20 is a method for determining a property of a sample, the method comprising: providing a sensor assembly comprising a sensing surface and a reference electrode, the reference electrode comprising a liquid-impermeable enclosure comprising liquid-impermeable walls enclosing a chamber, a first electrode element comprising a reference electrolyte electrode surface, a second electrode element provided at least partially outside the enclosure and comprising a sample electrode surface for contacting a sample matrix, the first, and second electrode elements being electrically connected through the enclosure; providing a reference electrolyte in the enclosure of the reference electrode such that the reference electrolyte electrode surface is in contact with the reference electrolyte; providing a sample to the sample electrode surface; and determining the property of the sample, based at least in part on sensor signals received from the sensor assembly.

Demonstrative Tests

To demonstrate the effectiveness of reference electrodes according to embodiments, an example system was configured using a reference electrode having the structure of the reference electrode 500' depicted in FIG. 5B. A schematic of the system is depicted in FIG. 5C in which the upper surface of the reference electrode 500' is in contact with a sample 501'. A working electrode 590' was provided.

In this example, the working electrode 590' is a pH electrode (Mettler Toledo; pH glass electrode) and the system was configured to measure the pH of the sample 501'. The reference electrode 500' used a first electrode element 510' formed of a high capacitance Pt black (1 mF; manufactured using high-surface area platinum black ink), a second electrode element 520' formed of a graphite-loaded conductive plastic (Acrylonitrile Butadiene Styrene (ABS) plastic loaded with 40% carbon fibres (RTP Plastics, US)), and a Au-coated contact pad as the conductive element 550'. The conductive element 550' was connected to the external measurement system (Autolab potentiostat in conjunction with Agilent E3631A/Hewlett Packard 3458A multimeter) as the reference electrode 500' at the base of the enclosure 530'.

Test 1

Figure 6:
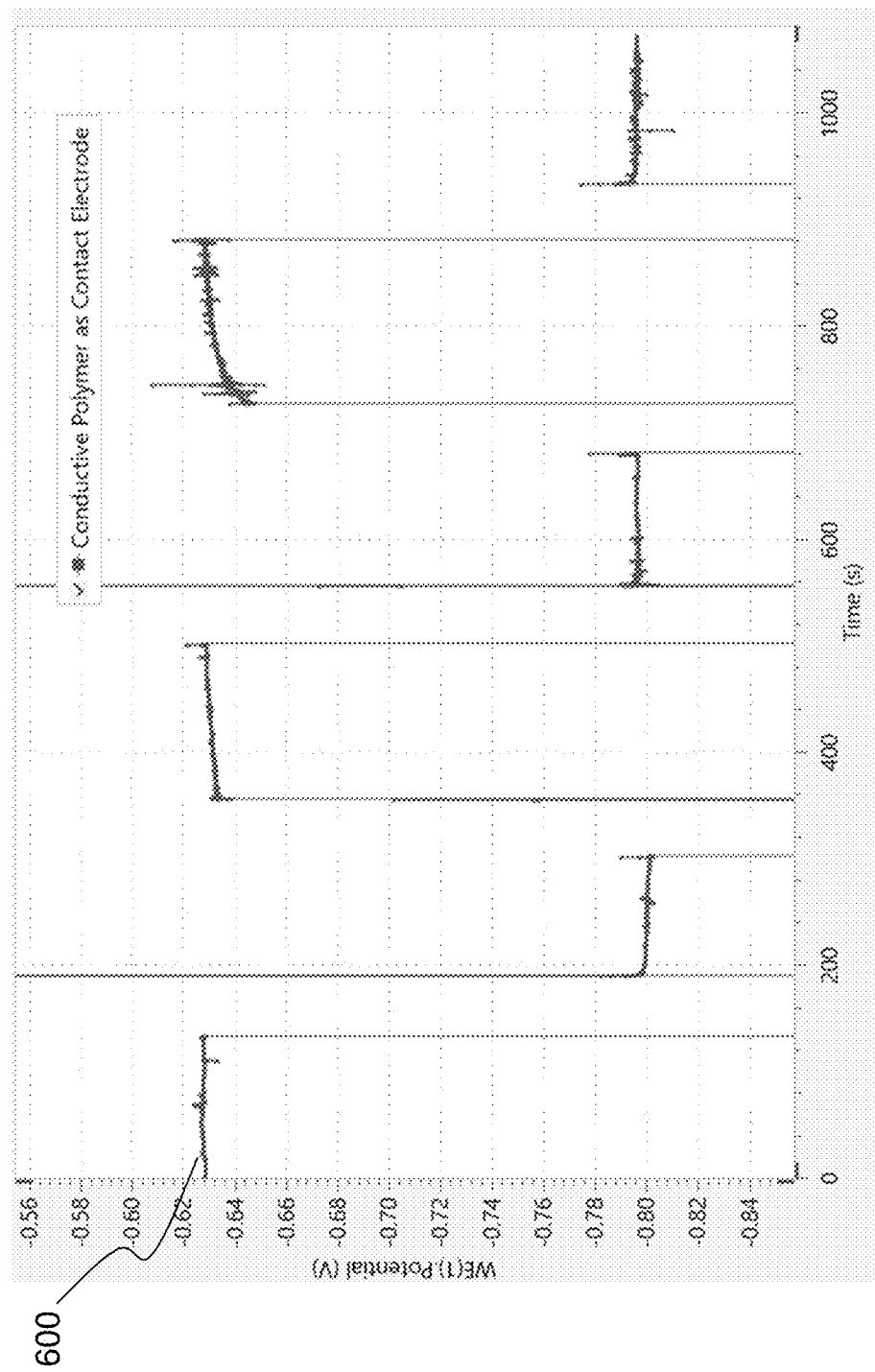
FIG. 6 provides a graph of the results of Test 1.

In a first experiment, the system was switched between pH4 and pH7 buffers (Reagecon) three times. The system was exposed to each buffer for approximately 120-140 seconds. FIG. 6 shows a graph (trace 600) of the results of this experiment that the system is able to accurately measure a difference in pH (with a measurement of ~58 mv/pH) and the system is sufficiently stable to switch between the pH buffers without any impact on measurement or performance. This demonstrates that the reference electrode 500' performs well.

Test 2

Figure 7:
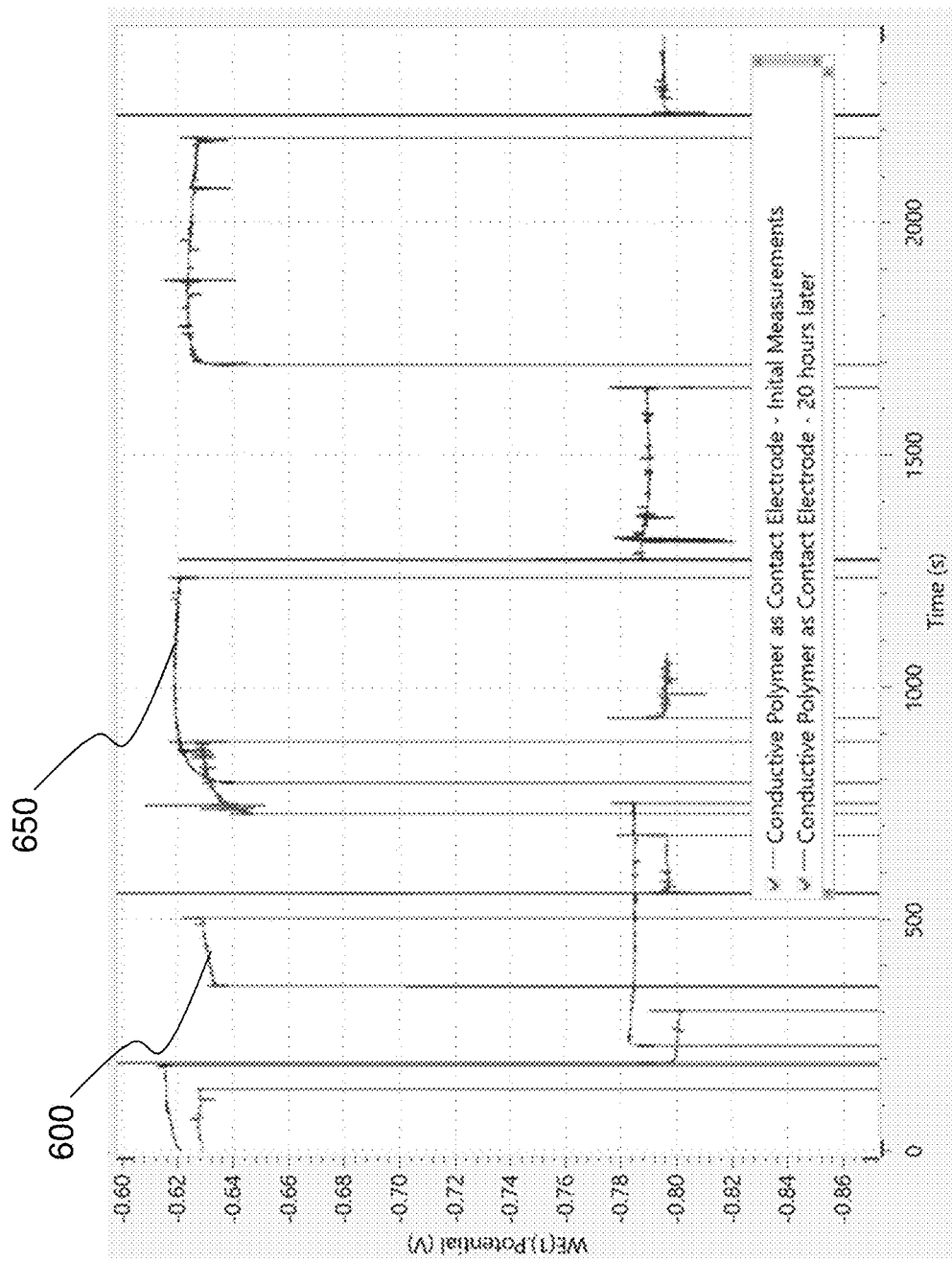
FIG. 7 provides a graph of the results of Test 2.

Test 2 was undertaken 20 hours after Test 1 and was otherwise identical to Test 1. FIG. 7 shows a graph of the results of Test 2 (trace 650) overlaid with the results of Test 1 (trace 600). It can be seen that there is little drift and the pH sensitivity remained good. Accordingly, the performance of the reference electrode 500' was stable.

Test 3

Figure 8:
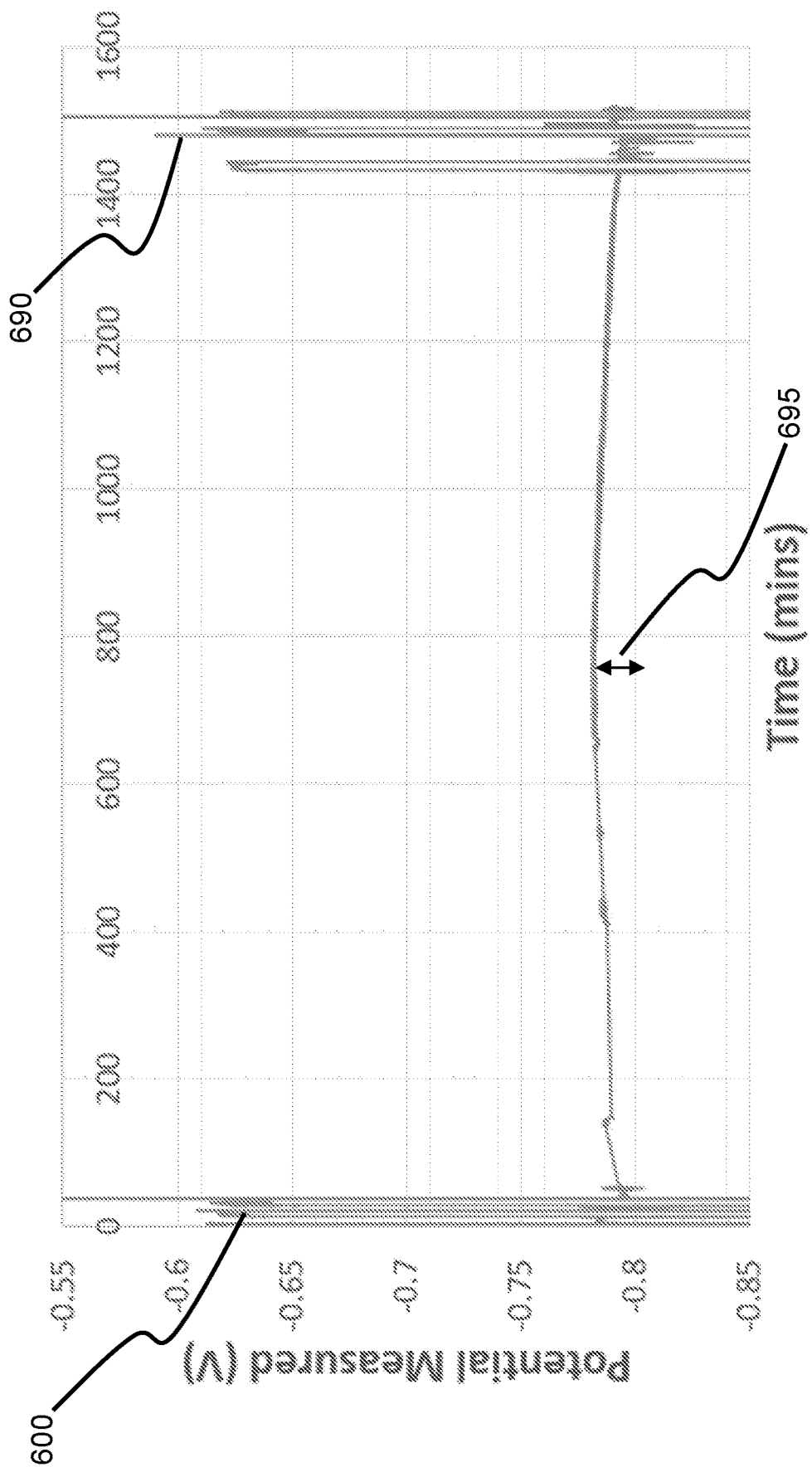
FIG. 8 provides a graph of the results of Test 3.

Test 3 comprised an initial test identical to Test 1 (carried out 12 hours after Test 1), followed by a period of >24 hours in which the system was left in ph7 buffer. A subsequent test identical to Test 1 was then repeated. FIG. 8 shows a graph of the results with the left hand part of the graph setting out the data for first part of the test (labeled 600) and the right hand side of the graph setting out the data for subsequent testing after >24 hours (labeled 690). The period in between represents the potential while the system remained in the ph7 buffer. Across this period, the potential remained relatively stable (<15 mV indicated by arrow 695). Accordingly, the reference electrode 500' performance was stable even during a long exposure period.

Figure 9:
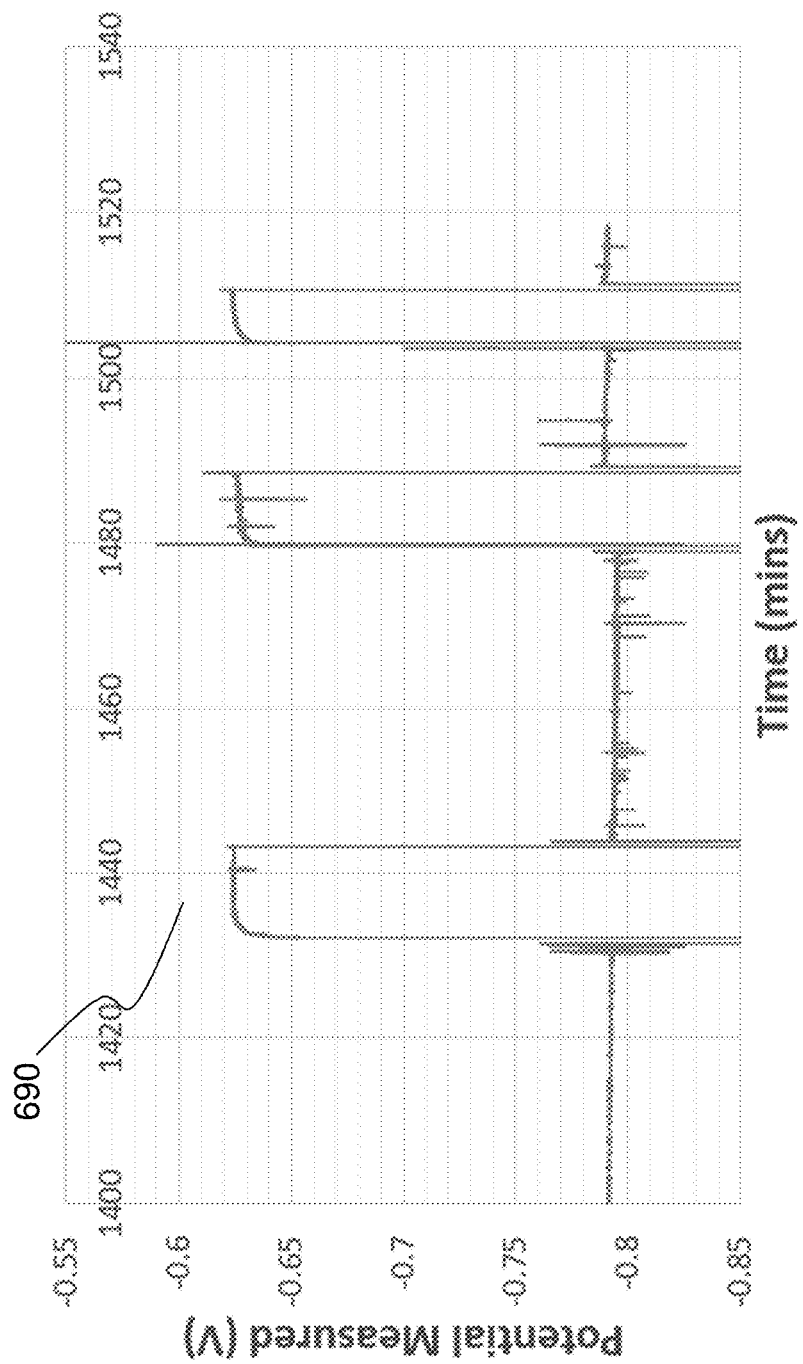
FIG. 9 provides a graph of the results of Test 3.

The subsequent readings during Test 3 (shown in FIG. 9) illustrate that the performance remained strong (with the lines are ~0.625 V representing the readings in the pH4 buffer and the lines at ~0.79 V representing the readings in the pH7 buffer). Accordingly, the performance of the reference electrode 500' did not deteriorate.

Test 4

5 days after the Test 1, a subsequent testing phase was carried out. This subsequent testing comprised immersing the system in ph4 buffer for ~10 mins, switching to a ph7 buffer, leaving the system immersed in the ph7 buffer for a period of approximately 6 hours, switching to the ph4 buffer for a period of ~15 mins and then re-immersing the system in ph7 buffer for ~3 hours.

Figure 10:
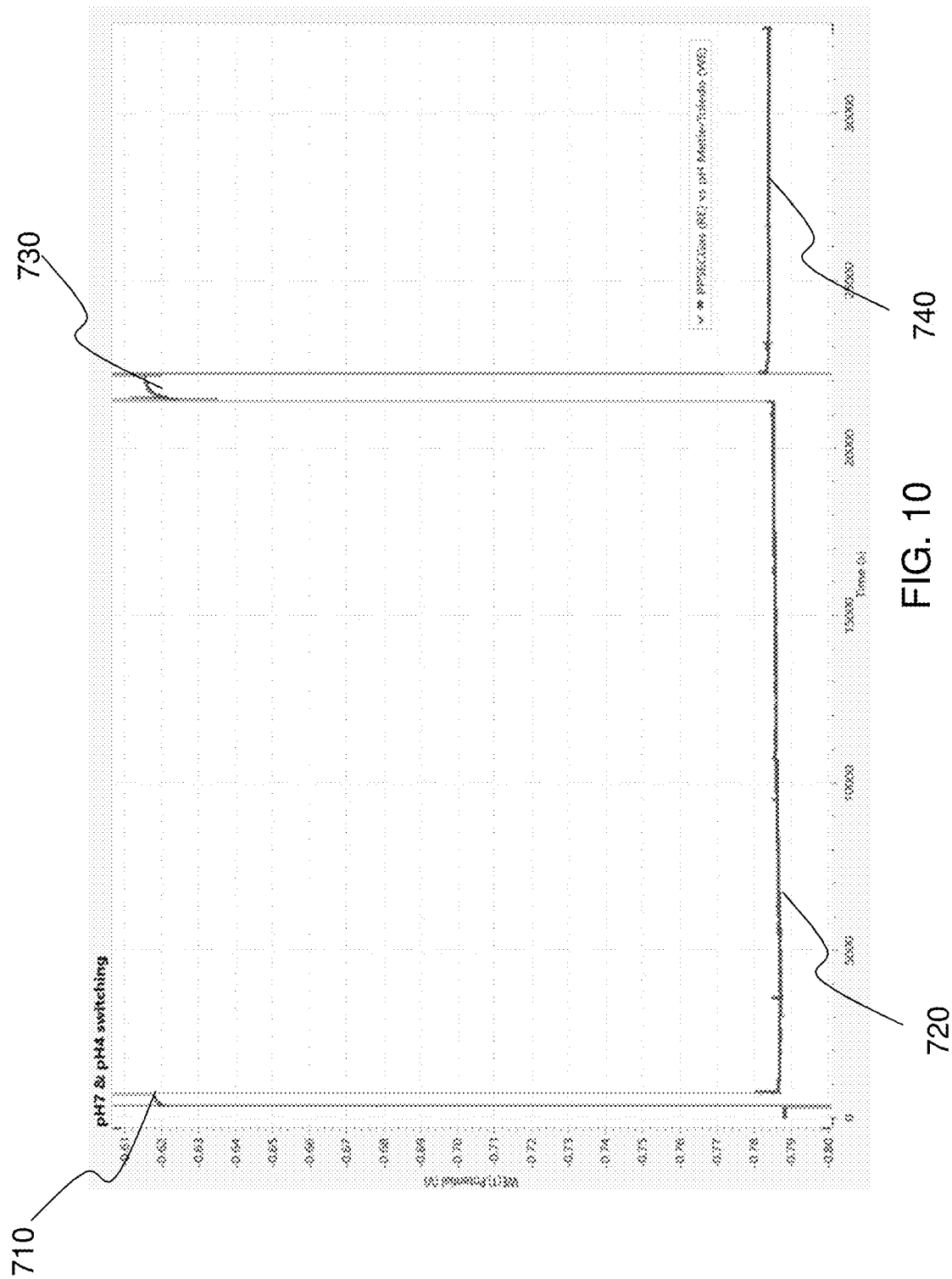
FIG. 10 provides a graph of the results of Test 4.

FIG. 10 shows a trace for the potential of the working electrode 590' during this period. Regions 710 and 730 show ph4 measurements, with the region between 720 representing the first immersion in ph7 buffer and the final region 740 representing the second immersion in ph7 buffer.

The results show that the reference electrode is stable after 5 days, since the system still provides good separation between the buffer readings. Moreover, the ph7 readings show very little drift (~3 mv over the course of the 9 hours depicted in FIG. 10).

Accordingly, Tests 1 to 4 show that reference electrodes according to embodiments provide a robust and stable reference electrode which show little drift over >5 days use. This suggests that there is no or very little leakage or contamination of the reference electrolyte and thus there are advantages over existing systems where prolonged exposure to buffer deteriorates performance rapidly.

Other Variations and Implementations

Although in the embodiments above, the reference electrolyte is primarily a reference solution, it will be appreciated that the benefits associated with embodiments of the invention also apply to those embodiments where the reference electrolyte is a solid, for example. It will also be appreciated that "reference solution electrode surface" and "reference electrolyte electrode surface" refer to the same surface are interchangeable for embodiments in which the reference electrolyte is a reference solution and that embodiments referring to a "reference solution electrode surface" can equally provide a "reference electrolyte electrode surface".

It should be understood that the detailed description and specific examples, while indicating exemplary embodiments of the apparatus, systems and methods, are intended for purposes of illustration only and are not intended to limit the scope. These and other features, aspects, and advantages of the apparatus, systems, and methods of the present invention can be better understood from the description, appended claims or select examples, and accompanying drawings. It should be understood that the Figures are merely schematic and are not drawn to scale. It should also be understood that the same reference numerals are used throughout the figures to indicate the same or similar parts.

Other variations to the disclosed embodiments can be understood and effected by those skilled in the art in practicing the disclosure, from a study of the drawings, the disclosure, and the appended select examples, or claims. In the select examples or claims, the word "comprising" does not exclude other elements or steps, and the indefinite article "a" or "an" does not exclude a plurality. The mere fact that certain measures are recited in mutually different dependent select examples or claims does not indicate that a combination of these measures cannot be used to advantage. Any reference signs in the claims should not be construed as limiting the scope.

What is claimed is:

1. A reference electrode, comprising:
    a liquid-impermeable enclosure comprising liquid-impermeable walls enclosing a chamber for receiving a reference electrolyte;
    a first electrode element comprising a reference electrolyte electrode surface arranged to contact a reference electrolyte when the reference electrolyte is received within the chamber; and
    a second electrode element provided at least partially outside the liquid-impermeable enclosure and comprising a sample electrode surface for contacting a sample, wherein the first electrode element and the second electrode element are electrically connected through the liquid-impermeable enclosure.

2. The reference electrode of claim 1, wherein the second electrode element is isolated from the chamber so as to not contact a reference electrolyte located within the chamber.

3. The reference electrode of claim 1, wherein the reference electrode comprises a conductive connecting element extending between the first electrode element and the second electrode element so as to electrically connect the first electrode element and the second electrode element.

4. The reference electrode of claim 3, wherein the first electrode element is located within the chamber; and the conductive connecting element extends through the liquid-impermeable walls of the liquid-impermeable enclosure to electrically connect the first electrode element and the second electrode element.

5. The reference electrode of claim 3, wherein the first electrode element is provided as a first layer and the conductive connecting element is provided as a second layer arranged on the first layer.

6. The reference electrode of claim 5, wherein the second electrode element is provided as a third layer arranged on the second layer.

7. The reference electrode of claim 3, wherein the first electrode element defines at least a part of the liquid-impermeable walls of the liquid-impermeable enclosure and is arranged so that the reference electrolyte electrode surface faces into the chamber; and/or wherein the conductive connecting element defines at least a part of the liquid-impermeable walls of the liquid-impermeable enclosure.

8. The reference electrode of claim 3, wherein the conductive connecting element comprises a conductive track or wire.

9. The reference electrode of claim 1, further comprising a substrate, wherein the substrate defines at least a part of the liquid-impermeable walls of the liquid-impermeable enclosure.

10. The reference electrode of claim 9, wherein the first electrode element and the second electrode elements are each provided on or in the substrate.

11. The reference electrode of claim 9, wherein the reference electrode comprises a conductive connecting element extending between the first electrode element and the second electrode element so as to electrically connect the first electrode element and the second electrode element; and wherein the conductive connecting element extends on and/or through the substrate to electrically connect the first electrode element and the second electrode element.

12. The reference electrode of claim 9, wherein the substrate and the first electrode element together at least partially define the liquid-impermeable walls of the liquid-impermeable enclosure; and/or wherein the reference electrode comprises a conductive connecting element extending between the first electrode element and the second electrode element so as to electrically connect the first electrode element and the second electrode element and wherein the substrate and the conductive connecting element together at least partially define the liquid-impermeable walls of the liquid-impermeable enclosure.

13. The reference electrode of claim 9, wherein the reference electrode comprises a liquid-impermeable membrane provided on the substrate, the liquid-impermeable membrane, and the substrate together at least partially defining the liquid-impermeable walls of the liquid-impermeable enclosure.

14. The reference electrode of claim 1, wherein a surface area of the reference electrolyte electrode surface of the first electrode element is at least five times greater than a surface area of the sample electrode surface or the second electrode element.

15. The reference electrode of claim 1, wherein the first electrode element comprises a first electrode material and the second electrode element comprises a second electrode material; and the first electrode material and the second electrode material are different.

16. The reference electrode of claim 1, wherein the first electrode element comprises a first electrode material selected from platinum, platinum black, carbon black, carbon nanotubes, or a combination thereof.

17. The reference electrode of claim 1, wherein the second electrode element comprises a second electrode material selected from silver, platinum, a conductive polymer material, or a combination thereof.

18. A system for determining a property of a sample, comprising:
    a sensing surface for contacting a sample and to provide a sample signal based on an interaction with the sample; and
    a reference electrode, wherein the reference electrode is to provide a reference signal indicative of a potential of the reference electrode, and the reference electrode comprises:
        liquid-impermeable enclosure comprising liquid-impermeable walls enclosing a chamber for receiving a reference electrolyte;
        a first electrode element comprising a reference electrolyte electrode surface arranged to contact a reference electrolyte when the reference electrolyte is received within the chamber; and
        a second electrode element provided at least partially outside the liquid-impermeable enclosure and comprising a sample electrode surface for contacting a sample, wherein the first electrode element and the second electrode element are electrically connected through the liquid-impermeable enclosure.

19. The system of claim 18, further comprising:
a signal processing unit to process the sample signal and reference signal received; and
a property determination unit to, based at least in part on the sample signal and reference signal processed by the signal processing unit, determine the property of the sample.

20. A method for determining a property of a sample, the method comprising:
providing a sensor assembly comprising a sensing surface and a reference electrode, the reference electrode comprising a liquid-impermeable enclosure comprising liquid-impermeable walls enclosing a chamber, a first electrode element comprising a reference electrolyte electrode surface, a second electrode element provided at least partially outside the liquid-impermeable enclosure and comprising a sample electrode surface for contacting a sample matrix, the first electrode element and the second electrode element being electrically connected through the liquid-impermeable enclosure;
providing a reference electrolyte in the liquid-impermeable enclosure of the reference electrode such that the reference electrolyte electrode surface is in contact with the reference electrolyte;
providing a sample to the sample electrode surface; and
determining the property of the sample, based at least in part on sensor signals received from the sensor assembly.

* * * * *